United States Patent
Griffin et al.

(10) Patent No.: US 12,253,982 B2
(45) Date of Patent: Mar. 18, 2025

(54) VERSION CONTROL OF FILES ENCODING INFORMATION VIA QUBITS

(71) Applicant: Red Hat, Inc., Raleigh, NC (US)

(72) Inventors: Leigh Griffin, Waterford (IE); Pierre-Yves Chibon, Paris la Defense (FR)

(73) Assignee: Red Hat, Inc., Raleigh, NC (US)

( * ) Notice: Subject to any disclaimer, the term of this patent is extended or adjusted under 35 U.S.C. 154(b) by 41 days.

(21) Appl. No.: 17/900,059

(22) Filed: Aug. 31, 2022

(65) Prior Publication Data
US 2024/0070122 A1  Feb. 29, 2024

(51) Int. Cl.
*G06F 16/18* (2019.01)
*H04L 9/08* (2006.01)

(52) U.S. Cl.
CPC ........ *G06F 16/1873* (2019.01); *H04L 9/0852* (2013.01)

(58) Field of Classification Search
CPC .... G06F 16/1873; H04L 9/0852; G06N 10/00
See application file for complete search history.

(56) References Cited

U.S. PATENT DOCUMENTS

| | | | |
|---|---|---|---|
| 10,459,647 B1* | 10/2019 | Lazier | G06F 3/064 |
| 11,295,227 B2 | 4/2022 | Coady et al. | |
| 11,586,966 B2* | 2/2023 | Sharma | G06F 9/5027 |
| 2002/0002567 A1* | 1/2002 | Kanie | G06F 40/194 |
| | | | 715/256 |
| 2016/0259821 A1* | 9/2016 | Rao | G06F 16/2477 |
| 2017/0351974 A1 | 12/2017 | Rose et al. | |
| 2018/0329967 A1* | 11/2018 | Lee | G06F 16/27 |
| 2020/0074346 A1* | 3/2020 | Griffin | G06N 20/00 |
| 2020/0394027 A1* | 12/2020 | Ducore | G06F 8/437 |
| 2021/0109907 A1 | 4/2021 | Chheda et al. | |
| 2021/0216420 A1 | 7/2021 | Kelly | |
| 2021/0406392 A1 | 12/2021 | Coady et al. | |
| 2022/0237490 A1* | 7/2022 | Coady | G06N 10/00 |
| 2023/0143652 A1* | 5/2023 | McKiernan | G06N 10/00 |
| | | | 706/62 |

OTHER PUBLICATIONS

Author Unknown, "User Guide: API Versioning, Quantum Fabric API Versioning," Temenos AG, https://docs.kony.com/konylibrary/konyfabric/kony_fabric_user_guide/Content/API_Versioning.htm, Apr. 27, 2022, 4 pages.

(Continued)

*Primary Examiner* — Hares Jami
(74) *Attorney, Agent, or Firm* — Dority & Manning, P.A.

(57) ABSTRACT

Quantum version control (QVC) services are disclosed that manage, track, and archives updates to the contents of a quantum file (QF). The QVC service tracks versions of a QF as updates are made to the QF, assigns a unique identifier to each version of the QF, and generates a version history for the QF. The QVC service enables a recovery of each version of the QF within the version history. The version history is encoded in metadata for the QF. The metadata for the QF enables the access of any version of the QF in the QF's version history. A set of qubits is prepared, such that quantum states of the set of qubits are in a superposition. The superposition of the quantum states of the set of qubits simultaneously encodes each version of the version history.

20 Claims, 10 Drawing Sheets

(56) References Cited

OTHER PUBLICATIONS

Author Unknown, "User Guide: Running Quantum and nqtspss," Unicom Systems, Inc., https://support.unicomsi.com/manuals/quantum/6/index.html#page/User Guide/DataConversionProgs.46.21.html, May 16, 2022, 5 pages.

Author Unknown, "IBM Quantum Composer User Guide: System Versioning," IBM Quantum, https://quantum-computing.ibm.com/composer/docs/iqx/manage/systems/versioning, 2021, 2 pages.

* cited by examiner

QUANTUM FILE METADATA (92)

| | A | B | C | D | E | F |
|---|---|---|---|---|---|---|
| 1 | | | File Name | Quantum_File_1 | | |
| 2 | Version Number | File Size (in Qubits) | TimeStamp | Encoding Qubit Address | Number of Updated Qubits | Updated Qubit Addresses |
| 3 | 1 | 10 | date-time_1 | Q_0 - Q_9 | | |
| 4 | 2 | 10 | date-time_2 | Q_10 - Q_19 | 2 | Q_12 - Q_13 |
| 5 | 3 | 10 | date-time_3 | Q_20 - Q_29 | 3 | Q_24 - Q_26 |
| 6 | 4 | 10 | date-time_4 | Q_30 - Q_39 | 4 | Q_31, Q_33, Q_35, Q_37 |
| 7 | 5 | 10 | date_time_5 | Q_40 - Q_49 | 1 | Q_43 |

*FIG. 3*

VERSION CONTROL OF FILES ENCODING INFORMATION VIA QUBITS

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently and accurately allocate qubits in real time will be desirable.

SUMMARY

The examples disclosed herein implement a quantum version control (QVC) service for version control of files encoding information via qubits. In particular, the QVC service manages, tracks, and effectively archives updates to the contents of a quantum file (QF). That is, the QVC service tracks versions of a QF as updates are made to the QF, assigns a unique identifier (e.g., a version number) to each version of the QF, and generates a version history that encodes a set of versions for the QF. In addition, the QVC service enables a recovery of each version of the QF within the version history (e.g., an ordered set of versions of the QF). For example, the QVC service may access the contents of any version in the version history of the QF. The version history of the QF may be encoded in metadata for the QF. The metadata for the QF may enable the access of any version of the QF in the QF's version history. In at least one embodiment, a set of qubits may be prepared, such that quantum states of the set of qubits are in a superposition (and state of entanglement). The superposition (and entanglement) of the quantum states of the set of qubits simultaneously encodes each version in the set of versions for the QF.

In one example, a method for version control of files encoding information via qubits includes receiving, by a computing device, a request to create an updated version of a quantum file (QF). Quantum states of a first set of qubits encode current data for a current version of the QF that is assigned a current version number. In response to receiving the request, the computing device may cause an allocation of a second set of qubits for the updated version of the QF. A cardinality of the second set of qubits is based on a quantity of information encoded in updated data for the updated version of the QF. The computing device may cause a preparation of quantum states of the second set of qubits to encode the updated data for the updated version of the QF. The computing device may assign an updated version number to the updated version of the QF based on the current version number assigned to the current version of the QF. The computing device may update metadata for the QF to indicate an association between the updated version of the QF, the updated version number, and the second set of qubits.

In another example, a computing device for version control of files encoding information via qubits is disclosed. The computing device comprises a system memory, and a processor device communicatively coupled to the system memory. The processor device is to receive a request to create an updated version of a quantum file (QF). Quantum states of a first set of qubits encode current data for a current version of the QF that is assigned a current version number. In response to receiving the request, the processor device may cause an allocation of a second set of qubits for the updated version of the QF. A cardinality of the second set of qubits is based on a quantity of information encoded in updated data for the updated version of the QF. The processor device may cause a preparation of quantum states of the second set of qubits to encode the updated data for the updated version of the QF. The processor device may assign an updated version number to the updated version of the QF based on the current version number assigned to the current version of the QF. The processor device may update metadata for the QF to indicate an association between the updated version of the QF, the updated version number, and the second set of qubits.

In another example, a non-transitory computer-readable medium is disclosed. The non-transitory computer-readable medium stores thereon computer-executable instructions that, when executed, cause one or more processor devices to receive a request to create an updated version of a quantum file (QF). Quantum states of a first set of qubits encode current data for a current version of the QF that is assigned a current version number. In response to receiving the request, the one or more processor devices may cause an allocation of a second set of qubits for the updated version of the QF. A cardinality of the second set of qubits is based on a quantity of information encoded in updated data for the updated version of the QF. The one or more processor devices may cause a preparation of quantum states of the second set of qubits to encode the updated data for the updated version of the QF. The one or more processor devices may assign an updated version number to the updated version of the QF based on the current version number assigned to the current version of the QF. The one or more processor devices may update metadata for the QF to indicate an association between the updated version of the QF, the updated version number, and the second set of qubits.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 3 shows a table encoding quantum file metadata for a full-copy embodiment of a quantum version control service;

DETAILED DESCRIPTION

Figure 1:
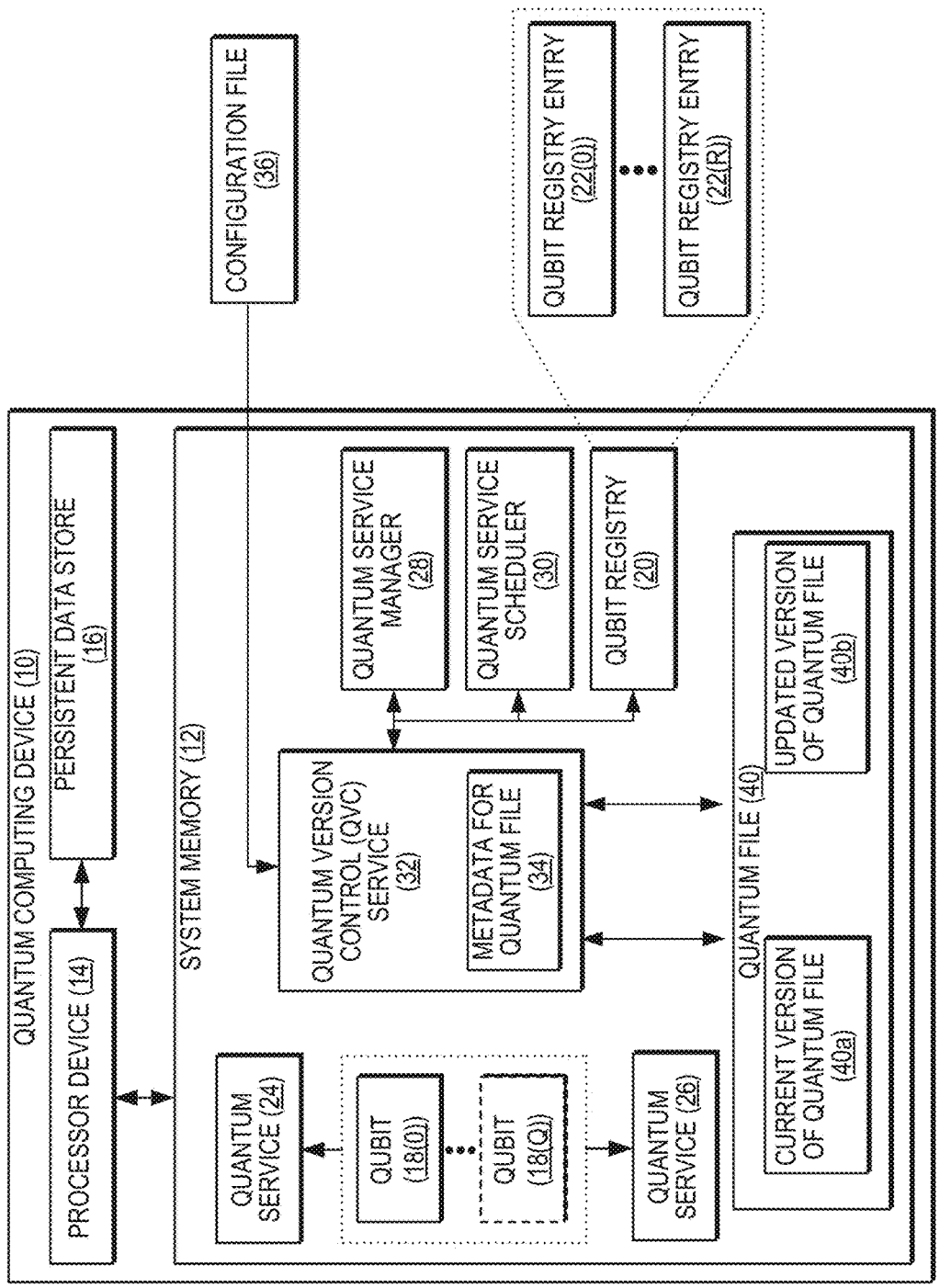
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

In some example settings, qubits of a quantum computing system (QCS) can be allocated and prepared to encode contents of a file (e.g., a quantum file). Similar to classical files, for which the contents of are encoded in classicals, updates to the contents of a QF results in sequence of separate versions of the QF. Also similar to classical files, when needing to access data encoded in the QF and due to the sequence of separate versions of the QF, a user must be diligent to access the version of the QF that is appropriate for their use of the encoded data. As also similar to classical files, when data is updated (e.g., deleted, modified, and/or added) in the QF, the previous versions of the affected data may be "lost to history" when the updated data is saved to the QF. To such ends, the embodiments are directed to a quantum version control (QVC) service of a QCS A QVC service of a QCS may manage, track, and effectively archive updates to the contents of a quantum file (QF). That is, the QVC service tracks versions of a QF as updates are made to the QF, assigns a unique identifier (e.g., a version number) to each version of the QF, and generates a version history that encodes a set of versions for the QF. In addition, the QVC service enables a recovery of each version of the QF within the version history (e.g., an ordered set of versions of the QF). For example, the QVC service may access the contents of any version in the version history of the QF. The version history of the QF may be encoded in metadata for the QF. The metadata for the QF may enable the access of any version of the QF in the QF's version history. In at least one embodiment, a set of qubits may be prepared, such that quantum states of the set of qubits are in a superposition (and state of entanglement). The superposition (and entanglement) of the quantum states of the set of qubits simultaneously encodes each version in the set of versions for the QF.

FIG. 1 is a block diagram of a quantum computing device 10 that comprises a system memory 12 and a processor device 14. The quantum computing device 10 further comprises a persistent data store 16 (e.g., a hard drive or Solid State Drive (SSD), as non-limiting examples). It is to be understood that the quantum computing device 10 in some examples may include constituent elements in addition to those illustrated in FIG. 1. The quantum computing device 10 operates in quantum environments but is capable of operating using classical computing principles or quantum computing principles. Thus, in some implementations, portions of the quantum computing device 10 (e.g., the quantum version control (QVC) service 32 described further herein) may be executed using classical computing components and/or algorithms.

When using quantum computing principles, the quantum computing device 10 performs computations that utilize quantum-mechanical phenomena, such as superposition and/or entanglement states. The quantum computing device 10 may operate under certain environmental conditions, such as at or near zero degrees (0°) Kelvin. When using classical computing principles, the quantum computing device 10 utilizes binary digits that have a value of either zero (0) or one (1).

In the example of FIG. 1, the quantum computing device 10 implements a set of one or more qubits $18(0)$-$18(Q)$ for use by quantum services executed by the quantum computing device 10. To maintain information for the qubit(s) $18(0)$-$18(Q)$, the quantum computing device 10 includes a qubit registry 20, which comprises a plurality of qubit registry entries $22(0)$-$22(R)$ each corresponding to a qubit such as the one or more qubits $18(0)$-$18(Q)$. The qubit registry 20 maintains and provides access to data relating to the qubits implemented by the quantum computing device 10, such as a count of the total number of qubits implemented by the quantum computing device 10 and a count of the number of available qubits that are currently available for allocation, as non-limiting examples. Each of the qubit registry entries $22(0)$-$22(R)$ of the qubit registry 20 also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an quantum phenomena indicator that indicates whether the corresponding qubit is in an entangled state and/or a superposition state.

The quantum computing device 10 of FIG. 1 executes one or more quantum services, such as the quantum service 24 and the quantum service 26. The quantum service 24 and the quantum service 26 are processes that employ qubits such as the one or more qubits $18(0)$-$18(Q)$ to provide desired functionality. Execution of quantum services such as the quantum service 24 and the quantum service 26 is facilitated by a quantum service manager 28 and a quantum service scheduler 30. The quantum service manager 28 of the quantum computing device 10 handles operations for creating, monitoring, and terminating quantum services, while the quantum service scheduler 30 of the quantum computing device 10 controls the scheduling of quantum services for execution by the processor device 14, and allocation of processing resources to executing quantum services. The functionality of the quantum service manager 28 and the quantum service scheduler 30 may be made accessible to other processes (e.g., via a defined application programming interface (API), as a non-limiting example).

The quantum computing device 10 of FIG. 1 implements a quantum version control (QVC) service 32 that manages, tracks, and effectively archives updates to the contents of a quantum file (QF) 40. Various embodiments of the QVC service 32 are discussed in conjunction with at least FIG. 1. However briefly here, as updates are made to a QF 40, the QVC service 32 tracks versions of the QF 40, assigns a unique identifier (e.g., a version number) to each version of the QF 40 (e.g., current version of QF 40*a* and updated version of QF 40*b*), and generates a version history that encodes a set of versions for the QF 40. In addition, the QVC service 32 enables a recovery of each version of the QF 40 within the version history (e.g., an ordered set of versions of the QF 40). For example, the QVC service 32 service may access the contents of any version in the version history of the QF 40. The version history of the QF 40 may be encoded in metadata 34 for the QF 40. The metadata 34 for the QF 40 may enable the access of any version of the QF 40 (e.g., the current version of QF 40 or the updated version of QF 40*b*) in the QF's 40 version history. In at least one embodiment, a set of qubits may be prepared, such that quantum states of the set of qubits are in a superposition (and state of entanglement). The superposition (and entanglement) of the quantum states of the set of qubits simultaneously encodes each version in the set of versions for the QF 40.

It is to be understood that, because the QVC service 32 is a component of the quantum computing device 10, functionality implemented by the QVC service 32 may be attributed to the quantum computing device 10 generally. Moreover, in examples where the QVC service 32 comprises software instructions that program the processor device 14 to carry out functionality discussed herein, functionality implemented by the QVC service 32 may be attributed herein to the processor device 14. It is to be further understood that while, for purposes of illustration only, the QVC service 32 is depicted as a single component, the functionality implemented by the QVC service 32 may be implemented in any number of components, and the examples discussed herein are not limited to any particular number of components.

Figure 2:
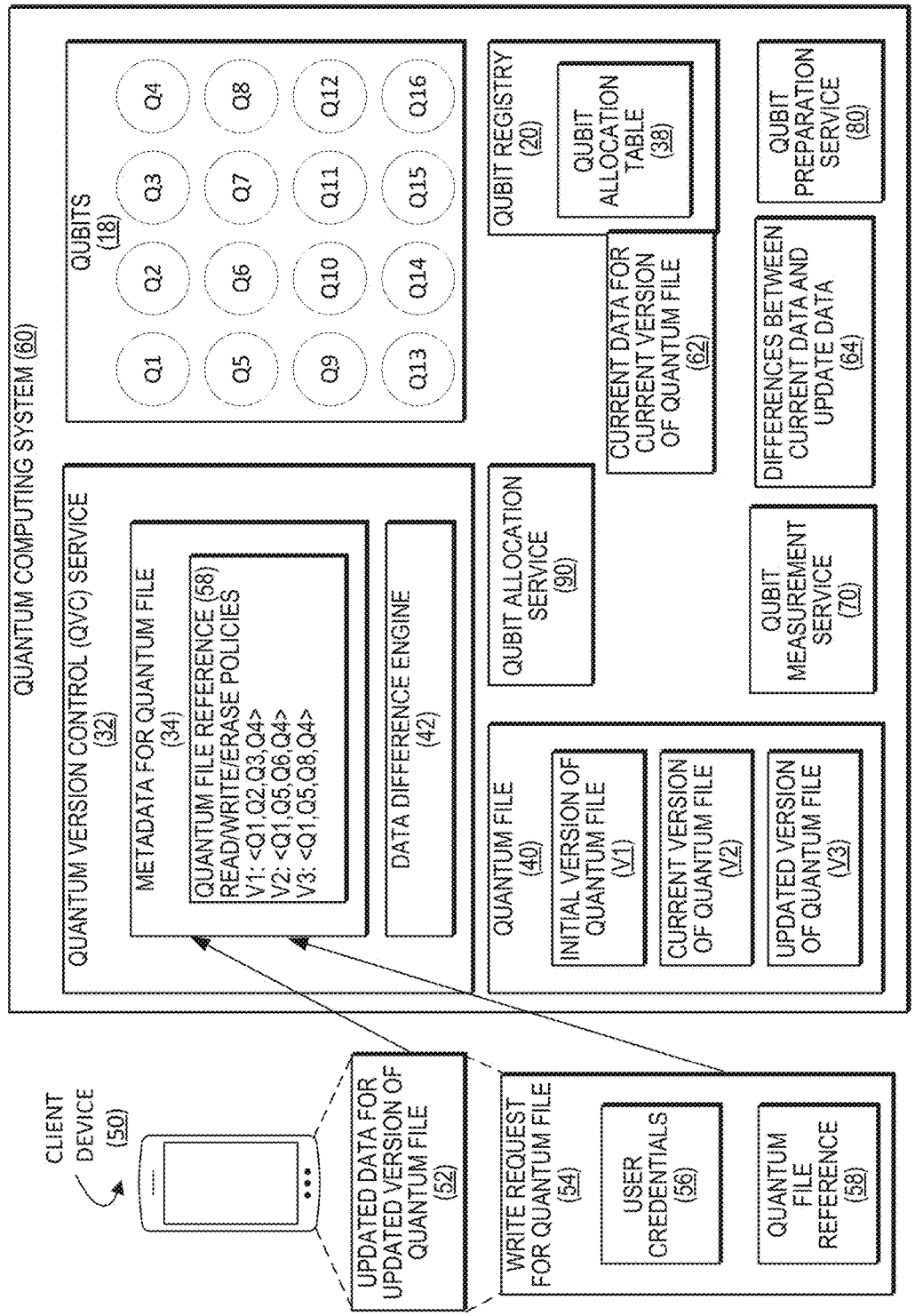
FIG. 2 is a block diagram of a quantum computing system that is consistent with various embodiments.

FIG. 2 is a block diagram of a quantum computing system (QCS) 60 that is consistent with various embodiments. The quantum computing system (QCS) 60 includes various components of the quantum computing device 10 of FIG. 1. In particular, QCS 60 includes the quantum version control (QVC) service 32, the quantum file (QF) 40, the metadata 34 for the QF 40, qubits 18, and the qubit registry 20 of the quantum computing device 10. Although not shown explicitly in FIG. 2, QCS 60 may include other, additional, and/or alternative components of quantum computing device 10.

The non-limiting embodiment of qubits 18 shown in FIG. 2 includes a set of qubits. In the non-limiting embodiment of FIG. 2, the set of qubits may include 16 separate qubits. A set of qubits address, which includes nine qubit addresses (e.g., Q1-Q16) may be employed to address the qubits of the set of qubits. In other embodiments, the set of qubits of qubits 18 may include more or less than 16 qubits.

The metadata 34 for the QF 40 stores a version history for the QF 40. A non-limiting example of a version history for the QF 40 includes three versions of the QF 40: an initial version V1 of the QF 40, a current version V2 of the QF 40, and an updated version V3 of the QF 40. For the purposes of this discussion, the QVC service 32 is enabling the update of the QF 40 from the current version V2 to the updated version V3 of the QF 40. The initial version V1 of the QF 40 may be a first version of the QF 40. The current version V2 of the QF 40 may be a second version of the QF 40. The updated version V3 of the QF 40 may be a third version of the QF 40. In addition to a file history, the metadata 34 may store a QF reference 58 and one or more read/write/erase policies, which are discussed below.

The QF 40 encodes file data via quantum states of encoding qubits. For example, the current version V2 of the QF 40 encodes current data 62. The updated version V3 encodes updated data 52 for the QF 40. In the non-limiting embodiment shown in FIG. 2, the file data for each of the initial version V1, the current version V2, and the updated version V3 of the QF 40 is encoded in four qubits of the set of qubits of qubits 18. In the non-limiting embodiment of the QVC service 32, writing an updated version of the QF 40 includes a "delta-copy" write process. In the delta-copy write process of FIG. 2, as updates to the file data are made, only the differences to the file data are encoded in additional qubits. For example, the metadata for the QF 40 shows that the initial data for the initial version V1 of the QF is encoded in an ordered initial set of qubits: (Q1, Q2, Q3, Q4). When updated to the current version V2 of the QF 40, the data encoded in the qubits (Q2, Q3) was updated. In the "delta-copy" embodiments, the current data 62 for the current version V2 of the QF 40 may be encoded in an ordered first set of qubits: (Q1, Q5, Q6, Q4). Accordingly, qubits (Q1, Q4) encode data for both the initial version V1 of the QF 40 and the current version V2 of the QF 40. Qubits (Q2, Q3) encode data for only the initial version V1 of the QF 40, while qubits (Q5, Q6) encode data for only the current version V2 of the QF 40. The QVC service 32 may include a data difference engine 42 to calculate the differences (or deltas) between consecutive versions of the QF 40.

Other embodiments of the QVC service 32 may include a "fully-copy" write process. For a full-copy write process, rather than only encoding differences between consecutive versions of the QF 40, unmodified data may be redundantly encoded in multiple qubits associated with separate versions of the QF 40. For example, in a "full-copy" embodiment, the current version V2 of the QF 40 may be encoded in the ordered set of qubits (Q5, Q6, Q7, Q8). In such a full-copy embodiment, the qubit sets (Q1, Q4) and (Q5, Q8) redundantly encode unmodified data that is common to both the initial version V1 of the QF 40 and the current version V2 of the QF 40. As shown in metadata 34 for the QF 40, in a delta-copy embodiment, the updated version V3 of the QF 40 may be encoded in the ordered second set of qubits: (Q1, Q5, Q8, Q4). The data encoded in qubit (Q6) has been updated from the current version V2 of the QF 40. In a full-copy embodiment, the updated version of the QF (V3) may be encoded in the ordered second set of qubits: (Q9, Q10, Q11, Q12). Note these distributed encodings may not require consecutive qubits with consecutive qubit addresses.

QCS 60 may additionally include a qubit measurement service 70, a qubit preparation service 80, and a qubit allocation service 90. As additional versions of the QF 40 are created, the qubit allocation service 90 is generally responsible for working with the qubit registry 20 to allocate additional qubits for storing encoding the file data of the additional versions of the QF 40. As such, the qubit registry service may generate, update, and store a qubit allocation table 38. The qubit allocation table 38 may indicate which qubits of qubits 18 are currently allocated to encode file data for the QF 40 (or other quantum files), and which qubits are currently unallocated. Thus, the qubit allocation table 38 may be an aggregation or accumulation of the information encoded in qubit registries 22(0)-22(R) of FIG. 1.

The qubit measurement service 70 is generally responsible for measuring the quantum states of the qubits 18 encoding file data for the QF 40. To decode (e.g., read and/or access) a particular version of the QF 40 (e.g., the current version V2 of the QF 40), the qubit measurement service 70 may measure or "read" the quantum states of the set of qubits (e.g., (Q1, Q5, Q6, Q4)) encoding the particular version (e.g., V2). The qubit measurement service 70 may measure the first set of qubits (e.g., (Q1, Q5, Q6, Q4)) to access (or decode) the current data 62 for the current version of the QM (V2). Accordingly, the qubit measurement service 70 may be a decoder (or reader) of file data encoded in the qubits 18.

Note that in various embodiments, various ordered sets of qubits 18 may encode the various versions of the QF 40, via "pure" quantum states. A "pure" quantum state of a qubit may be a quantum state that is not in a superposition of the two possible eigenstates of the qubit. Thus, the two pure quantum states of a qubit may be represented either $|0\rangle$ or $|1\rangle$, but not $\sqrt{1/2}(|0\rangle + |1\rangle)$. That is, a pure quantum state of a qubit may be an eigenstate of a measuring device or apparatus included in the qubit measurement service 70. Thus, when the qubit measurement service 70 measures the quantum state of a qubit, "collapsing the qubit's wavefunction" (and thus losing information) is not an issue.

The qubit preparation service 80 is generally responsible for preparing quantum states of qubits 18 to encode file data. As noted above, because the file data is encoded, via pure quantum states, the qubit preparation service 80 may be enabled to prepare a quantum state of a qubit in either its two eigenstates $|0\rangle$ or $|1\rangle$. The qubit preparation service 80 may be enabled to prepare quantum states of qubits in superposition and entanglement (e.g., $\sqrt{1/2}(|00\rangle + |11\rangle)$). Accordingly, the qubit measurement service 70 may be a file data decoder, while the qubit preparation service 80 may be a file data encoder.

To update the version of the QF 40 from the current version V2 to the updated version V3, the QVC service 32 receives various inputs from a client device 50. Such inputs may include but are not limited to updated data 52 for the updated version V3 of the QF 40. The inputs from the client device 50 may further include a write request 54 for the QF 40. The write request 54 may include credentials 56 (e.g., user credentials) and a QF reference 58. The QF reference 58 may be a unique identifier, pointer, file name, file address, or the like that may be used to uniquely identify the QF 40 from a plurality of quantum files. The contents of a first (e.g., initial) version of the QF 40 may include initial file data. The initial file data is encoded in quantum states of an initial set of qubits. As discussed above and indicated in the metadata 34 for the QF 40, the initial set of qubits may include the set: (Q1, Q2, Q3, Q4)

The QVC service 32 assigns an initial version number to the initial version of the QF 40 (e.g., V1). The QVC service 32 may manage various read (e.g., access), write, and/or erase operations (e.g., requested by client device 50) through read/write/erase policies for the QF. That is, the QVC service may either grant or deny any request for a read, write, or erase operation based on the corresponding read/write/erase policy and credentials associated with a party requesting the read, write, or erase operation for the QF. As shown in FIG. 2, such read/write/erase policies may be encoded in the metadata 34 for the QF 40. As such, the read/write/erase policies may be updated though the history of the QF 40. Each version within the history may have separate read/write/erase policies.

Current data 62 for the current version V2 of the QF 40 may be encoded in quantum states of a current (e.g., first) set of qubits (e.g., (Q1, Q5, Q6, Q4)). Each qubit of the first set of qubits may be accessed via a corresponding qubit address included in a first set of qubit addresses. To successfully encode the current data 62, the first set of qubits may be an ordered set of qubits and the first set of qubit addresses may be an ordered set of qubit addresses. There may exist a one-to-one correspondence between the first ordered set of qubits and the first ordered set of qubit addresses. The QVC service 32 may have assigned a (unique) current version number to the current version of the QF (e.g., V2). As shown in FIG. 2, an association between the current version V2 of the QF 40, the current version number, and a first set of addresses corresponding to the first set of qubits may be encoded in the metadata 34 for the QF 40.

The QVC service 32 may receive updated data 52 for the updated version V3 of the QF 40. The updated data 52 may include the entirety of the contents of the updated version V3 of the QF 40, including data that is common to both a current version V2 of the QF 40 and the updated version V3 of the QF 40. The updated data 52 may be received from the client device 50. The QVC service 32 may additionally receive a write request 54 for the updated version V3 of the QF 40 from the client device 50. In addition to the write request 54, the QVC service 32 may receive credentials 56 for the party (or user) requesting the write operation. The credentials 56 may be encoded in the write request 54. The QVC service 32 may additionally receive a QF reference 58 for the QF 40. As shown in FIG. 2, the QF reference 58 may be encoded in the write request 54. The QVC service 32 may authenticate or approve the write request 54 based on the credentials 56 and one or more write policies for the QF (e.g., policies included in the metadata 34 for the QF 40).

In response to validating the write request 54 the QVC service 32 may assign a (unique) updated version number (e.g., V3) to the updated version V3 of the QF 40. In at least one embodiment, the updated version number (e.g., V3) may be determined based on incrementing the current version number (e.g., V2) assigned to the current version V2 of the QF 40. In response to validating (or approving) the write request 54, the QVC service 32 may determine a number of qubits required to encode the updated data 52. In full-copy embodiments, the QVC service 32 may determine a number of qubits required to encode the entirety of the updated data 52 (e.g., 4 qubits). In dela-copy embodiments, the QVC service 32 may determine a number of qubits required to encode only the differences (or deltas) between the updated data 52 and the current data 62 (e.g., 2 qubits). The QVC service 32 may provide a qubit allocation request to the qubit allocation service 90 of the QCS 60. The qubit allocation request may encode the number of qubits required to encode the entirety (or differences) of the updated data 52. Based on a qubit allocation table and the required number of qubits, the qubit allocation service may identify a second set of qubits that are currently unallocated. The qubit allocation service 90 may forward the allocation request (or at least the number of required qubits) to the qubit registry 20. Via the qubit allocation table 38, the qubit registry may provide a set of qubit addresses to the qubit allocation service 90. The qubit allocation service 90 may allocate an ordered second set of qubits, e.g., (Q5, Q6) for delta-copy embodiments or (Q5, Q6, Q7, Q8) for full-copy embodiments. As discussed below, in full-copy embodiments, the qubit preparation service 80 may encode the entirety of the updated data 52 in quantum states of the second set of qubits. In delta-copy embodiments, the qubit preparation service 80 may encode the differences between the current data 62 and the updated data 52 in quantum states of the second set of qubits.

Each qubit of the second set of qubits may be accessed via a corresponding qubit address included in a second set of qubit addresses. To successfully encode the updated data 52, the second set of qubits may be an ordered set of qubits and the second set of qubit addresses may be an ordered set of qubit addresses. There may exist a one-to-one correspondence between the second ordered set of qubits and the second ordered set of qubit addresses. The qubit allocation service 90 and/or the qubit registry 20 may update the qubit allocation table 38 to indicate that each qubit included in the second set of qubits is now allocated. The update of the qubit allocation table 38 may indicate that each qubit address included in the second set of qubit addresses is associated with a qubit that is allocated for and/or associated with the updated version V3 of the QF 40. The qubit allocation service 90 may provide the second set of qubit addresses to the QVC service 32.

The data difference engine 42 may compare the current data 62 with the updated data 52 to generate the differences 64 (or deltas) between the current data 62 and the updated data 52. Based on a comparison between the current data 62 and the updated data 52 (e.g., the differences 64), the QVC service 32 may identify portions of the QF 40 that need to be updated to reflect the updates in the updated data 52, as compared to the current data 62. The data difference engine 42 may employ "diff" functionality) to perform the comparison between the current data 62 and the updated data 52. The data difference engine 42 may identify one or more equivalences between the current data 62 and the updated data 52, as well as one or more differences between the current data 62 and the updated data 52. Based on the one or more equivalences between the current data 62 and the updated data 52 and the one or more differences between the current data 62 and the updated data 52, the QVC service 32 may generate a map between the first set of qubits and the second set of qubits. The map may indicate a mapping between at least a subset of the first set of qubit addresses and at least a subset of the second set of qubit addresses. Because of the one-to-one correspondence between the first set of qubits and the first set of qubit addresses, and the one-to-one correspondence between the second set of qubits and the second set of qubit addresses, the map be a map between the first set of qubits addresses and the second set of qubit addresses.

Note that because updating the current data 62 may include adding new data, deleting current data, or modifying current data, the correspondence between the first set of qubit addresses and the second set of qubit addresses may not be a one-to-one mapping. For example, for qubits of the first set of qubits that encode data that is deleted in the updated data 52, there may be corresponding qubit addresses in the first set of qubit addresses that have no correspondence to qubit addresses in the second set of qubit addresses. For qubits of the second set of qubits that will encode data that is added in the updated data 52, there may be corresponding qubit addresses in the second set of qubit addresses that have no correspondence to qubit addresses in the first set of qubit addresses. Accordingly, the map between the first set of qubits addresses and the second set of qubit addresses may be a partial mapping.

More specifically, based on the comparison between the current data 62 and the updated data 52, the QVC service 32 may identify three disjoint portions of each of the current data 62 and the updated data 52. The first portion of the current data 62 and the first portion of the updated data 52 may include data that is common to both the current data 62 and the updated data 52. The data that is common to both the current data 62 and the updated data 52 may be data that is unmodified in updating the QF 40. Thus, the data of the first portion of the current data 62 may be equivalent to the data of the first portion of the updated data 52. The second portion of updated data 52 may include data that has been modified, as compared to the corresponding data of the second portion of the current data 62. Thus, the data of the second portion of the updated data 52 may a "one's complement" to the data of the second portion of the current data 62. The data of the third portion of the current data 62 may include data that has been deleted in the updated data 52. Thus, the data of the third portion of the current data 62 may not have a correspondence to the updated data 52. The data of the third portion of the updated data 52 may include data that has been add to the current data 62. Thus, the data of the third portion of the updated data 52 may not have a correspondence to the current data 62.

Based on the mapping between the first set of qubits and the second set of qubits and the identification of the three disjoint portions of the current data and the three disjoint portions of the updated data, the QVC service 32 may identify three disjoint subsets of qubits in the first set of qubits and three disjoint subsets of qubits in the second set of qubits. The first subset of qubits of the first set of qubits and the first subset of qubits of the second set of qubits may have a one-to-one correspondence. The first subset of qubits of the first set of qubits may encode the first portion of the current data 62 that is common to both the current data 62 and the updated data 52. The qubit preparation service 80 may cause a preparation of quantum states of the first subset of the second set of qubits to encode the first portion of the current data 62 that is common to both the current data 62 and the updated data 52. Accordingly, the data encoded in the first subset of the second set of qubits may be equivalent to the first portion of the current data 62.

The second subset of the first set of qubits and the second subset of the second set of qubits may have a one-to-one correspondence. The second subset of qubits of the first set of qubits may encode the second portion of the current data 62 that has been modified in the updated data 52. The qubit preparation service 80 may cause a preparation of quantum states of the second subset of the second set of qubits to encode the second portion of the updated data 52 that has been modified in the updated data 52. Accordingly, the data encoded in the second subset of the second set of qubits may be a one's complement to the data encoded in the second subset of qubits in the first set of qubits.

There may be correspondence between the third subset of the first set of qubits and the third subset of the second set of qubits. The data encoded in the third subset of the first set of qubits may encode the third portion of the current data 62 (e.g., the portion of the current data 62 that has been deleted in the updated data 52). Accordingly, the data encoded in the third subset of the first set of qubits may have no correspondence and/or equivalency to the current data 62. The qubit preparation service 80 may cause a preparation of quantum states of the third subset of the second set of qubits to encode the third portion of the updated data 52 that has been added in the updated data 52. Accordingly, the data encoded in the third subset of the second set of qubits may have no correspondence and/or equivalency to the current data 62.

The QVC service 32 may update the metadata 34 of the QF 40. The QVC service 32 may update the metadata 34 for the QF 40 to indicate an association between the updated version V3 of the QF 40, the updated version number (e.g., V3) assigned to the updated version V3 of the QF 40, and the second set of qubit addresses. In at least one embodiment, updating the metadata 34 for the QF 40 may include updating the metadata 34 to indicate the map between the first set of qubit addresses and the second set of qubit addresses. In various embodiments, updating the metadata 34 for the QF 40 may include updating the metadata 34 to indicate the first, second, and third subsets of the first set of qubits, as well as the first, second, and third subsets of the second set of qubits. For example, corresponding first, second, and third subsets of qubit addresses of the first set of qubit addresses may be indicated in the updated metadata 34 for the QF 40. Likewise, corresponding first, second, and third subsets of qubit addresses of the second set of qubit addresses may be indicated in the updated metadata 34 for the QF 40.

In at least one embodiment, a third set of qubits may be prepared, such that quantum states of the set of qubits are in a superposition (and state of entanglement). The superposition (and entanglement) of the quantum states of the set of qubits simultaneously encodes each version (e.g., V1, V2, and V2) in the set of versions for the QF 40.

FIG. 3 shows a table encoding quantum file metadata 92 for a full-copy embodiment of a quantum version control service. The quantum file metadata 34 is embedded in a 2D table comprised of rows, columns, and cells. In the first row, a quantum file (QF) reference is encoded in the quantum file metadata 92 via a file name (e.g., "Quantum_File_1"). At least a portion of the quantum file metadata 92 is encoded in field-value pairs. The second row of the tables lists a separate field name in each columns. In the table encoding the quantum file metadata 92, the each row after the second row corresponds to a separate version of the "Quantum_File_1" QF. Each column of the table corresponds to a separate field of the quantum file metadata 92. The fields include version number, file size (in qubits), timestamp (date and time the version was encoded), the addresses for the encoding qubits, the number of updated qubits in the version, and the addresses of the updated qubits. Because quantum file metadata 92 is for a full-copy embodiment, file data that is unmodified between consecutive versions of the QF is redundantly encoded in separate qubits allocated to separate file versions. In the embodiment shown in FIG. 3, there are five versions of the QF, and each version is encoded in ten qubits.

To illustrate exemplary operations performed by the quantum computing device 10 of FIG. 1 and/or quantum computing system (QCS) 60 of FIG. 2 for providing version controls of files encoding information via qubits, FIGS. 4A-4D provide a flowchart for a method 100. Elements of FIGS. 1-2 are referenced in describing FIGS. 4A-4D for the sake of clarity. Method 100 begins, after a start block, at block 102, where updated data for updating a current version of a quantum file is received. The current version of the quantum file may encode current data for the quantum file. At block 104, a write request is received. The write request may be a request to create an updated version of the quantum file. The write request may encode a reference. The encoded reference may be a reference for the quantum file (e.g., a file name) and/or a referenced to a file that encodes metadata for the quantum file. In some embodiments, the write request may encode write credentials for the party (e.g., a user) that is requesting the update to the quantum file. At decision block 106, it is determined whether the write request is approved based on the write credentials of the requesting party. If it is determined that the write request is not to be approved, then method 100 flows to block 108. If it is determined that the write request is approved, then method 100 flows to block 110. At block 108, the requesting party may be provided an indication that their write request has be denied. Method 100 may then return to block 102 to await for another write request.

At block 110, an updated version number is assigned to the updated version of the quantum file. The updated version number may be based on incrementing a current version number of the current version that quantum fire. The current version number may be encoded in the quantum file metadata. At block 112, a qubit address is identified for each qubit in a first ordered set of qubits. The first ordered set of qubits may encode the current data for the current version of the quantum file. The addresses of the first ordered set of qubits may be encoded in the quantum file metadata. At block 114, the current data of current version of quantum file may be accessed. Accessing the current data may be based on the addresses of the first ordered set of qubits. After execution of block 114 of FIG. 4A, method 100 may then proceed to block 116 of FIG. 4B.

Figure 4A:
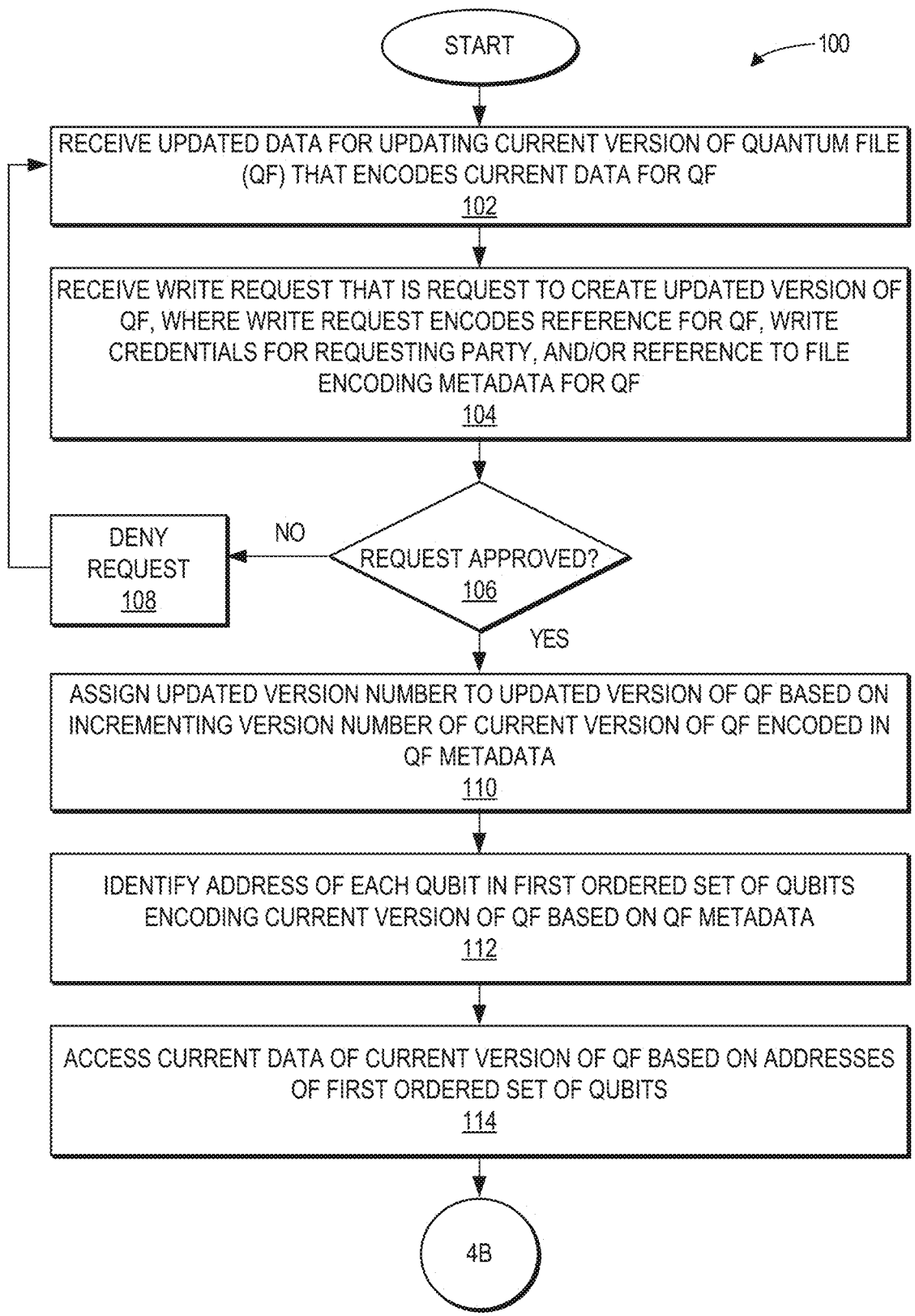
FIGS. 4A-4D provide a flowchart for a method for providing quantum version control services for files encoding information via qubits that is consistent with various embodiments.
Figure 4B:
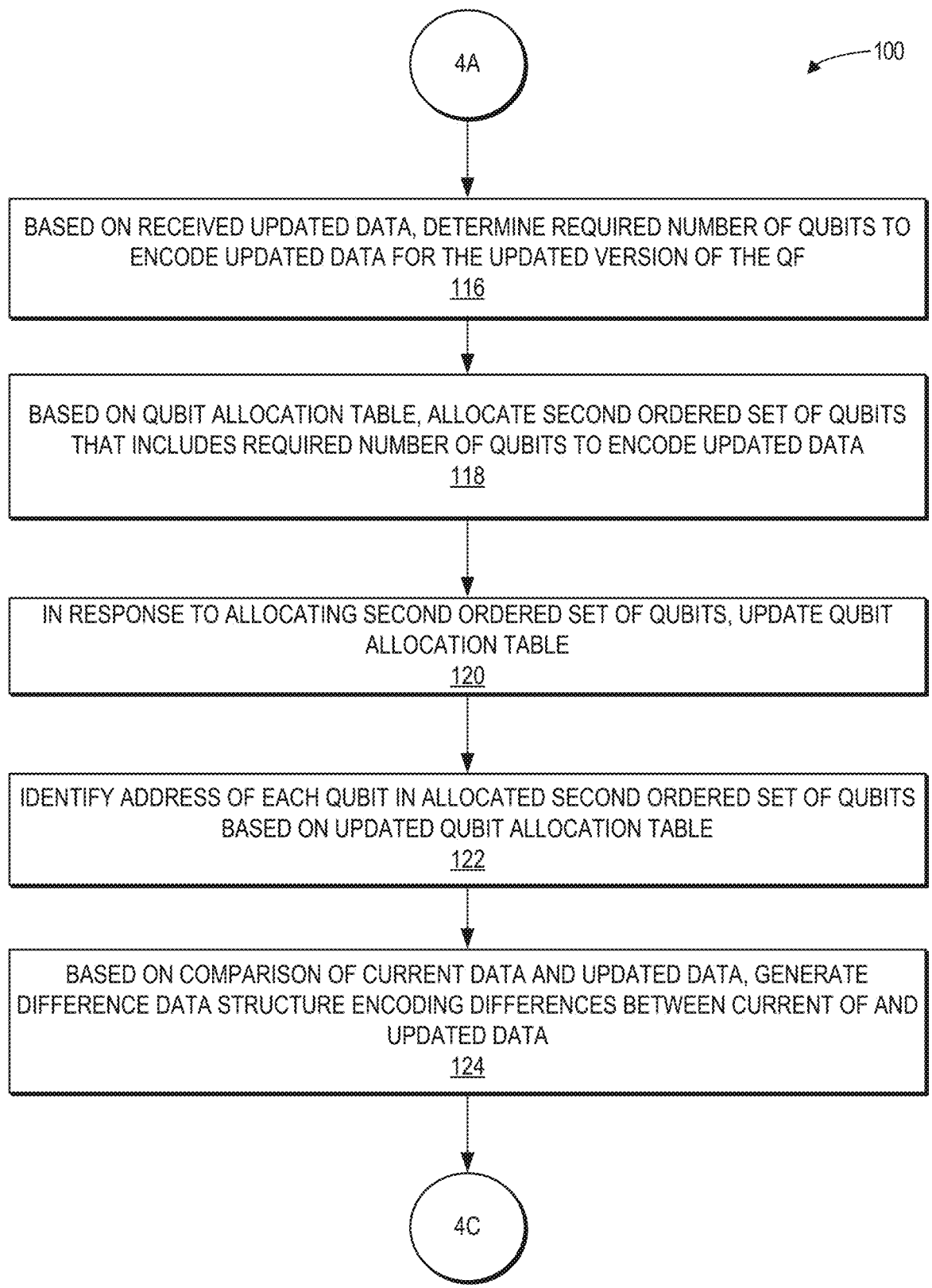

At block 116 of FIG. 4B, a required number of qubits to encode the updated data for the updated version of the quantum file is determined. Determining the required number of qubits may be based on the received updated data. At block 118, a second ordered set of qubits is allocated. The number of qubits in the second ordered set of qubits maybe the required number of qubits to encode the updated data. Allocating the second ordered set of qubits may be based on a qubit allocation table. At block 120, the qubit allocation table may be updated to indicate that the second ordered set of qubits is now allocated. Updating the qubit allocation table may be in response to allocating the second ordered set of qubits. At block 122, an address for each qubit in the allocated second ordered set of qubits is determined. Determining the qubit addresses for the second ordered set of qubits may be based on the updated qubit allocation table. At block 124, a difference data structure is generated. The difference data structure may encode differences between the current data and the updated data. Generating the difference data structure may be based on a comparison between the current data and the updated data. After execution of block 124 of FIG. 4B, method 100 may then proceed to block 126 of FIG. 4C.

Figure 4C:
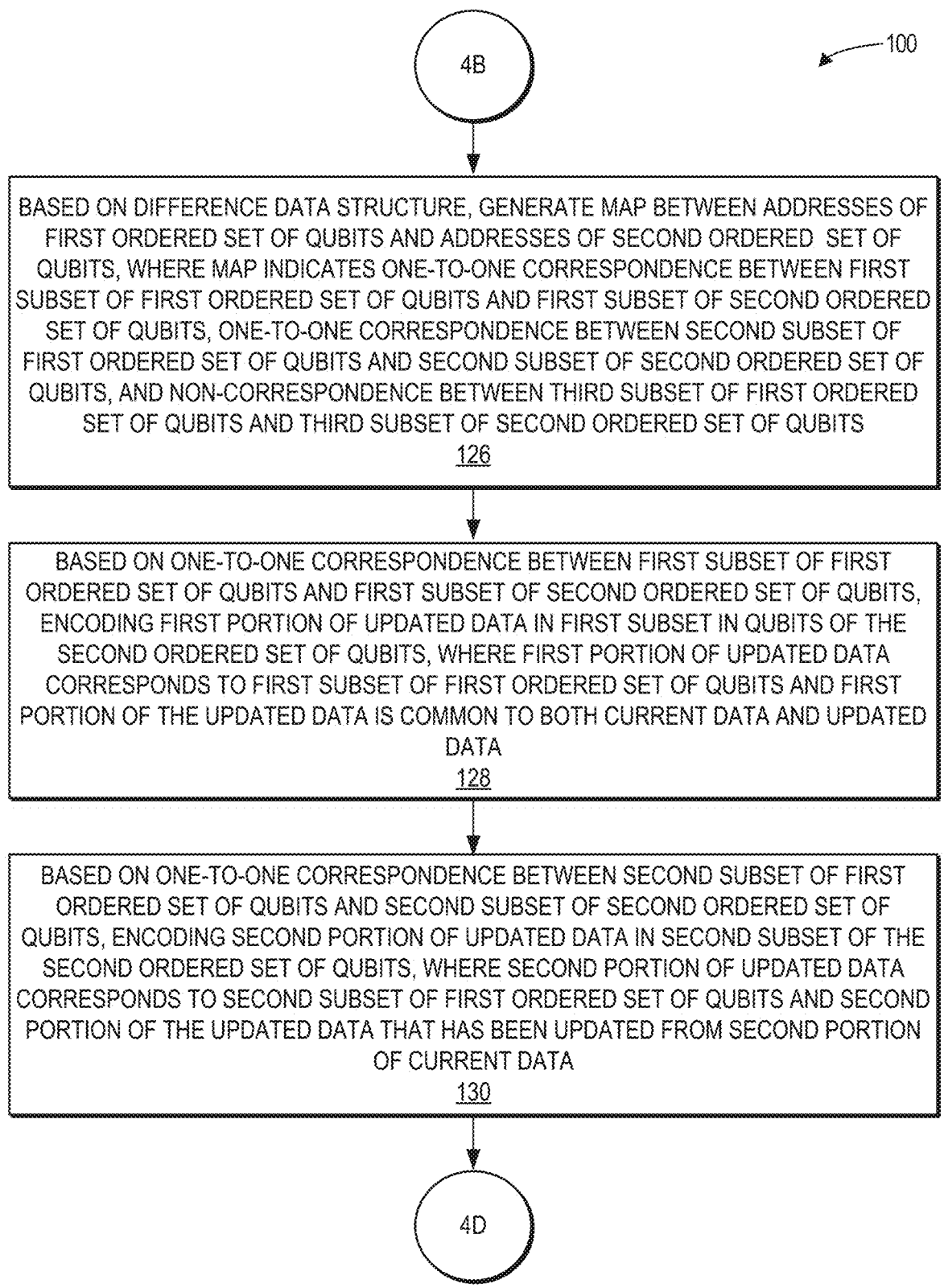

At block 126 of FIG. 4C, a map may be generated based on the data differences and data equivalences encoded in the difference data structure. The map may be a map between the addresses of the first ordered set of qubits and the addresses of the second ordered set of qubits. The map may indicate a one-to-one correspondence between a first subset of the first ordered set of qubits and a first subset of the second ordered set of qubits. The map may additionally indicate a one-to-one correspondence between a second subset of the first ordered set of qubits and a second subset of the second ordered set of qubits. Furthermore, the map may indicate a non-correspondence between a third subset of the first order set a qubits and a third subset of the second ordered subset of qubits.

At block 128, a first portion of the current data may be encoded in the first subset of qubits of the second ordered set of qubits. Encoding the first portion of the current data may be based on the one-the-one correspondence between the first subset of the first ordered set of qubits and the first subset of the second ordered set of qubits. The first portion of the current data may correspond to the first subset of the first ordered that are qubits. The first portion of the updated data may have data that is common to both the current data and the updated data.

At block 130, a second portion of the updated data may be encoded in the second subset of the second ordered set of qubits. Encoding the second portion of the updated data in the second subset of the second ordered set of qubits may be based on the one-to-one correspondence between the second subset of the first ordered set of qubits and the second subset of the second ordered set of qubits. The second portion of the updated data may correspond to the second subset of the first ordered set of qubits. The second portion of the updated data may be data that was updated and/or modified from the current data. After execution of block 130 of FIG. 4C, method 100 may then proceed to block 132 of FIG. 4D.

Figure 4D:
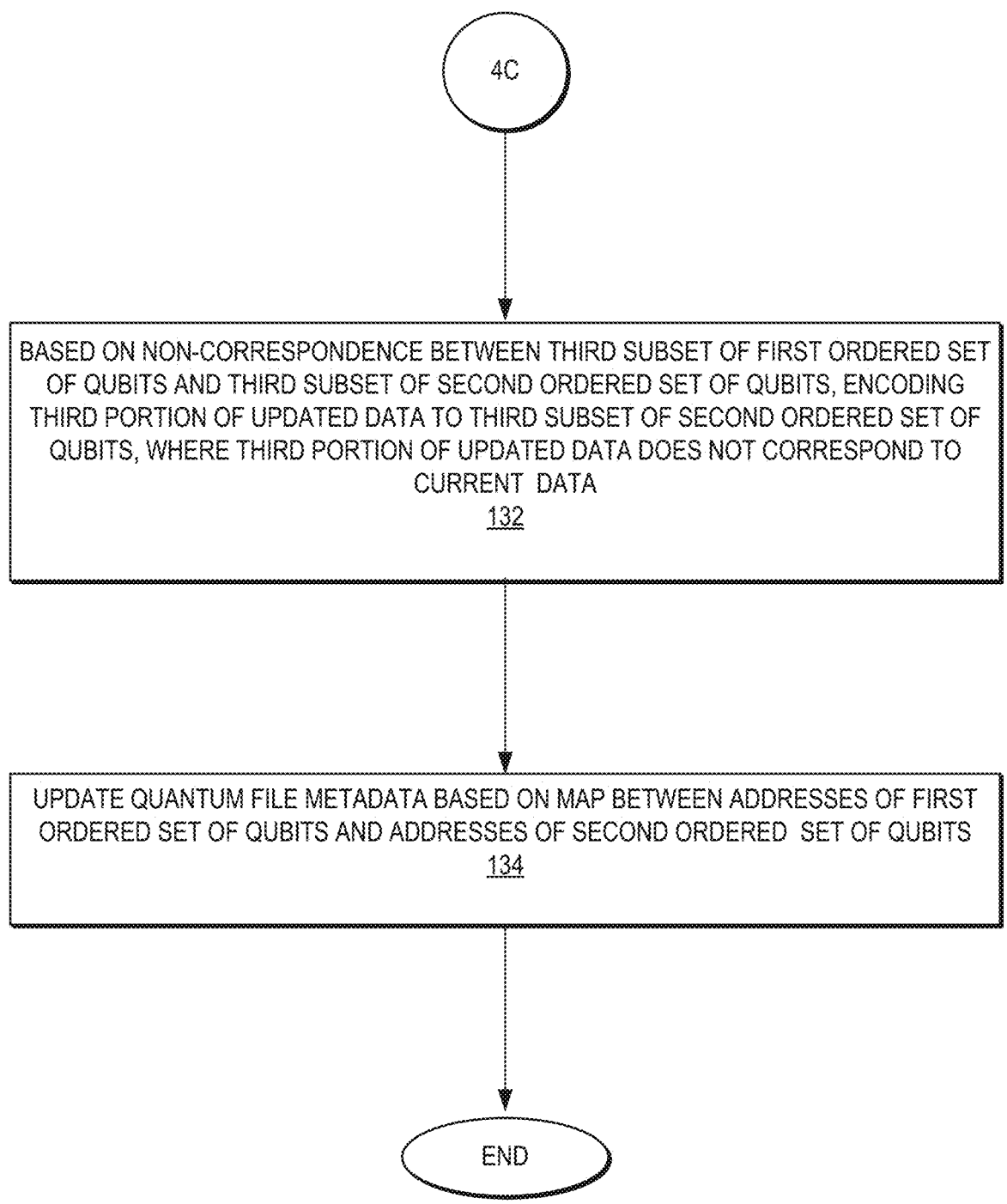

At block 132 of FIG. 4D, a third portion of the updated data is encoded in the third subset of the second ordered set of qubits. Encoding of the third portion of the updated data may be based on the non-correspondence between the third subset of the first ordered set of qubits and the third subset of the second ordered set of qubits. The third portion of the updated data may not correspond to the current data and may include data that is only in the updated data. At block 134 the quantum file metadata may be updated based on the map between the addresses of the first ordered set of qubits and the second ordered set of qubits.

Figure 5:
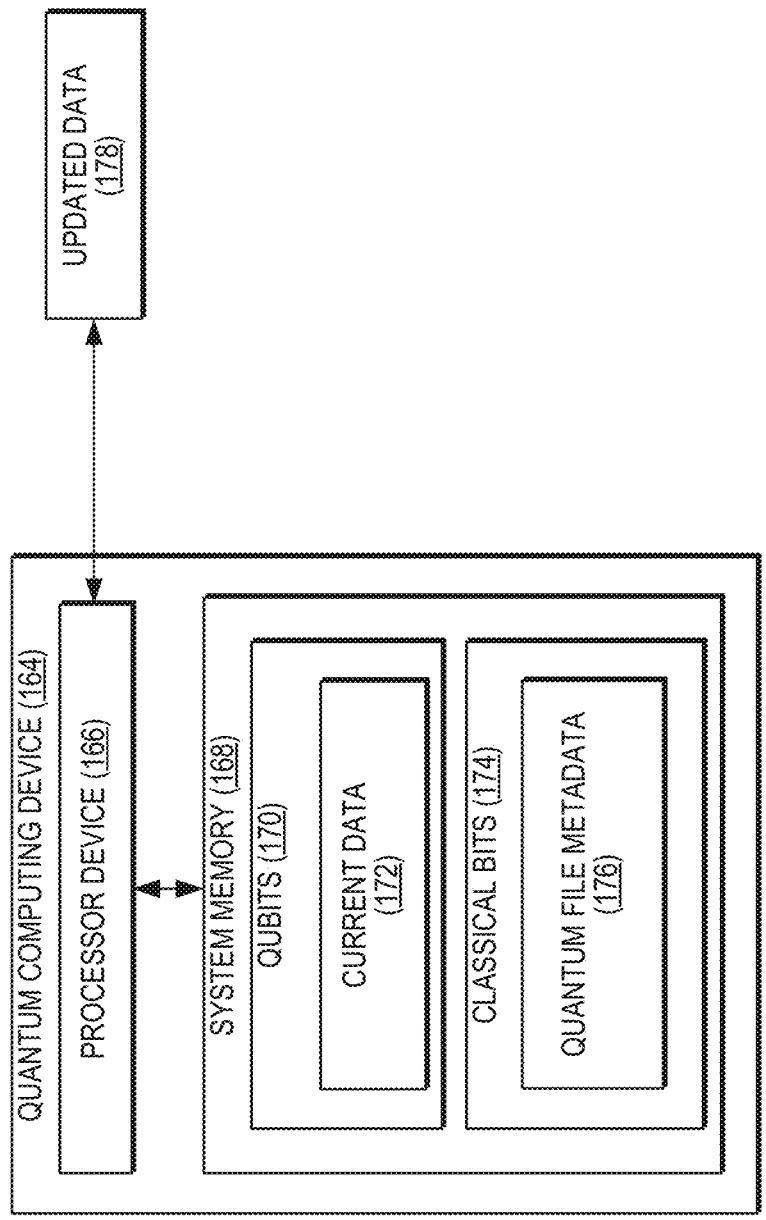
FIG. 5 is a simpler block diagram of the quantum computing device of FIG. 1 for version control of files encoding information via qubits, according to one example.

FIG. 5 is a simpler block diagram of the quantum computing device 10 of FIG. 1 for version control of files encoding information via qubits, according to one example. In the example of FIG. 5, a quantum computing device 164 comprises a system memory 168 and a processor device 166. A first portion of the system memory 168 may be implemented by qubits 170. A second portion of the system memory may be implemented by classical bits 174. The system memory stores current data 172 for a current version of a quantum file (QF) that is assigned a current version number. The current data 172 may be encoded in quantum states of a first set of qubits of the quantum computing device's 164 qubits 170. The processor device 166 receives a request to create an updated version of the QF. The processor device 166 may additionally receive updated data 178 for the updated version of the QF. The updated data 178 may be encoded classically, or via quantum computation-based encodings. In response to receiving the request, the processor device 166 may cause an allocation of a second set of qubits (of qubits 170) for the updated version of the QF. A cardinality of the second set of qubits is based on a quantity of information encoded in the updated data 178 for the updated version of the QF. The processor device 166 may cause a preparation of quantum states of the second set of qubits to encode the updated data 178 for the updated version of the QF. The processor device 166 may assign an updated version number to the updated version of the QF based on the current version number assigned to the current version of the QF. The processor device 166 may update quantum file metadata 176 for the QF to indicate an association between the updated version of the QF, the updated version number, and the second set of qubits. The quantum file metadata 176 may be encoded in the classical bits 174.

Figure 6:
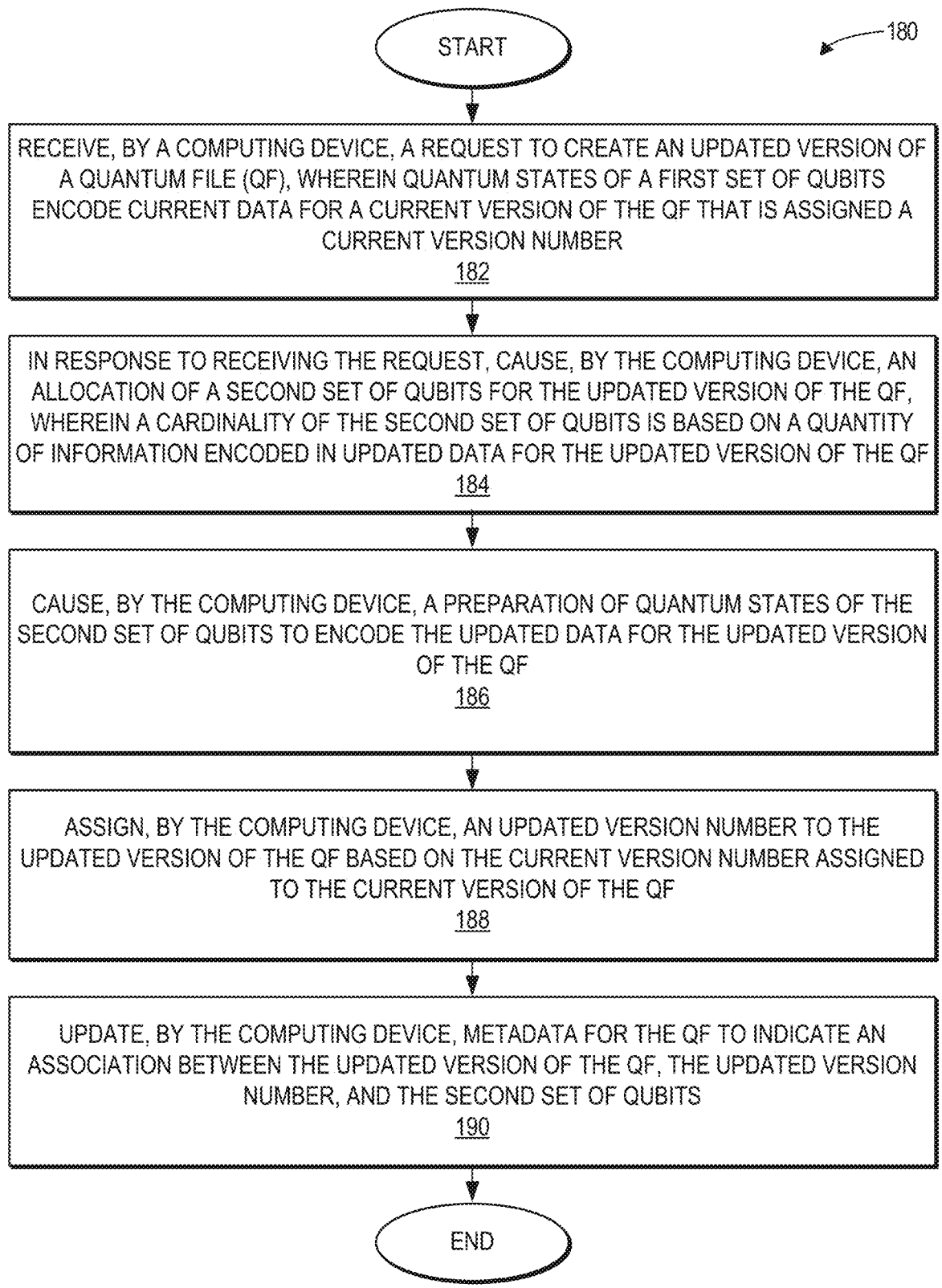
FIG. 6 is a flowchart of a simplified method for qubit allocation for version control of files encoding information via qubits, according to one example.

FIG. 6 provides a flowchart of a simplified method for version control of files encoding information via qubits by the quantum computing device 164 of FIG. 5, according to one example. Method 180 begins, after a start block, at block 182, where a computing device receives a request to create an updated version of a quantum file (QF). Quantum states of a first set of qubits encode current data for a current version of the QF that is assigned a current version number. At block 184 and in response to receiving the request, the computing device may cause an allocation of a second set of qubits for the updated version of the QF. A cardinality of the second set of qubits is based on a quantity of information encoded in updated data for the updated version of the QF. At block 186, the computing device may cause a preparation of quantum states of the second set of qubits to encode the updated data for the updated version of the QF. At block 188, the computing device may cause an assigning of an updated version number to the updated version of the QF based on the current version number assigned to the current version of the QF. At block 190, the computing device may cause an updating of metadata for the QF to indicate an association between the updated version of the QF, the updated version number, and the second set of qubits.

In additional embodiments, the computing device may receive a set of credentials associated with the request. The computing device may authenticate the request based on the set of credentials. In response to authenticating the request, the computing device may allocate the second set of qubits for the updated version of the QF.

In at least one embodiment, the current version number assigned to the current version of the QF is encoded in the metadata for the QF. The computing device may receive a reference to the metadata for the QF. The computing device may access the metadata for the QF based on the reference. The computing device may identify the current version number assigned to the current version of the QF based on accessing the metadata for the QF. The computing device may determine the updated version number based on incrementing the current version number.

In an embodiment, the computing device may receive the updated data for the updated version of the QF. The computing device may determine the quantity of information encoded in updated data based on reading the updated data. The computing device may determine the cardinality of the second set of qubits based on the quantity of information encoded in updated data.

In some embodiments, causing the allocation of the second set of qubits may include the computing device providing an allocation request to a qubit allocation service. The allocation request encodes the cardinality of the second set of qubits. The qubit allocation service may receive the allocation request. In response to receiving the allocation request, the qubit allocation service may allocate the second set of qubits based on the cardinality of the second set of qubits encoded in the allocation request and a qubit allocation table. The qubit allocation service may provide the encoding of the second set of qubit addresses corresponding to the second set of qubits to the computing device. The qubit allocation service may identify the second set of qubit addresses based on a qubit allocation table indicating that each qubit address in the second set of qubit addresses corresponds to a qubit that is currently unallocated. For each qubit address in the second set of qubit addresses, the qubit allocation service may allocate the qubit corresponding to the qubit address by including the qubit in the second set of qubits. The qubit allocation service may update the qubit allocation table to indicate that each qubit address in the second set of qubit addresses is currently allocated. In response to providing the allocation request, the computing device may receive an encoding of a second set of qubit addresses corresponding to the second set of qubits.

In some embodiments, a first set of qubit addresses is encoded in the metadata for the QF. Each address of the first set of qubit addresses corresponds to a qubit in the first set of qubits. The computing device may identify the first set of qubit address by consulting the metadata for the QF. The computing device may cause an access of the current data for the current version of the QF based on the first set of qubit addresses.

Causing the access of the current data may include the computing device providing a qubit read request to a qubit measurement service. The qubit read request encodes the first set of qubit addresses. The qubit measurement service may receive the qubit read request. The qubit measurement service may access the first set of qubits based on the first set of qubit addresses encoded in the qubit read request. In response to receiving the qubit read request, the qubit measurement service may measure a quantum state of each qubit included in the first set of qubits. The qubit measurement service may generate the encoding of the current data for the current version of the QF based on the observing the quantum state of each qubit included in the first set of qubits. The qubit measurement service may provide the encoding of the current data for the current version of the QF to the computing device. In response to providing the first set of qubit addresses, the computing device may receive an encoding of the current data for the current version of the QF from the qubit measurement service.

In various embodiments, the computing device may generate a difference data structure encoding one or more differences between the updated data and the current data and one or more equivalences between the updated data and the current data. The computing device may identify a first portion of the current data and a first portion of the updated data. Each of the first portion of the current data and the first portion of the updated data encodes the one or more equivalences between the updated data and the current data. The computing device may identify a second portion of the current data and a second portion of the updated data. Each of the second portion of the current data and the second portion of the updated data encodes the one or more differences between the updated data and the current data. The first portion of the updated data may be equivalent to the first portion of the current data and the second portion of the updated data may be a one's complement encoding of the second portion of the current data.

In some embodiments, the computing device may generate a map between the first set of qubits and the second set of qubits. Generating the map may be based on a correspondence between the first portion of the updated data and the first portion of current data and a correspondence between the second portion of the updated data and the second portion of the current data. The computing device may identify a first subset of the first set of qubits and a first subset of the second set of qubits based on the correspondence between the first portion of the updated data and the first portion of current data. The computing device may identify a second subset of the first set of qubits and a second subset of the second set of qubits based on the correspondence between the second portion of the updated data and the second portion of current data.

In some embodiments, causing the preparation of the quantum states of the second set of qubits to encode the updated data includes the computing device causing a preparation of quantum states of the first subset of qubits of the second set of qubits to encode the first portion of the current data. The computing device may cause a preparation of quantum states of the second subset of qubits of the second set of qubits to encode the second portion of the updated data.

Updating the metadata for the QF may include updating the metadata for the QF to indicate a correspondence between the first subset of the first set of qubits and the first subset of the second set of qubits. The metadata for the QF may be updated to indicate a correspondence between the second subset of the first set of qubits and the second subset of the second set of qubits.

Updating the metadata for the QF comprises may include updating the metadata for the QF to indicate a version history of the QF that enables a recovery of each version of a plurality versions of the QF.

In at least one embodiment, the method may further include causing, by the computing service, a preparation of quantum states of a third set of qubits such that the quantum states of third set of qubits is in a superposition that encodes each version of the plurality of versions of the QF.

Another method may include receiving a request to create an updated version of a quantum file (QF). Quantum states of a first set of qubits may encode current data for a current version of the QF that is assigned a current version number. The method may include, in response to receiving the request, causing an allocation of a second set of qubits for the updated version of the QF, wherein a cardinality of the second set of qubits is based on a quantity of information encoded in updated data for the updated version of the QF. A preparation of quantum states of the second set of qubits may be caused to encode the updated data for the updated version of the QF. An updated version number may be assigned to the updated version of the QF based on the current version number assigned to the current version of the QF. Metadata for the QF may be updated to indicate an association between the updated version of the QF, the updated version number, and the second set of qubits.

Figure 7:
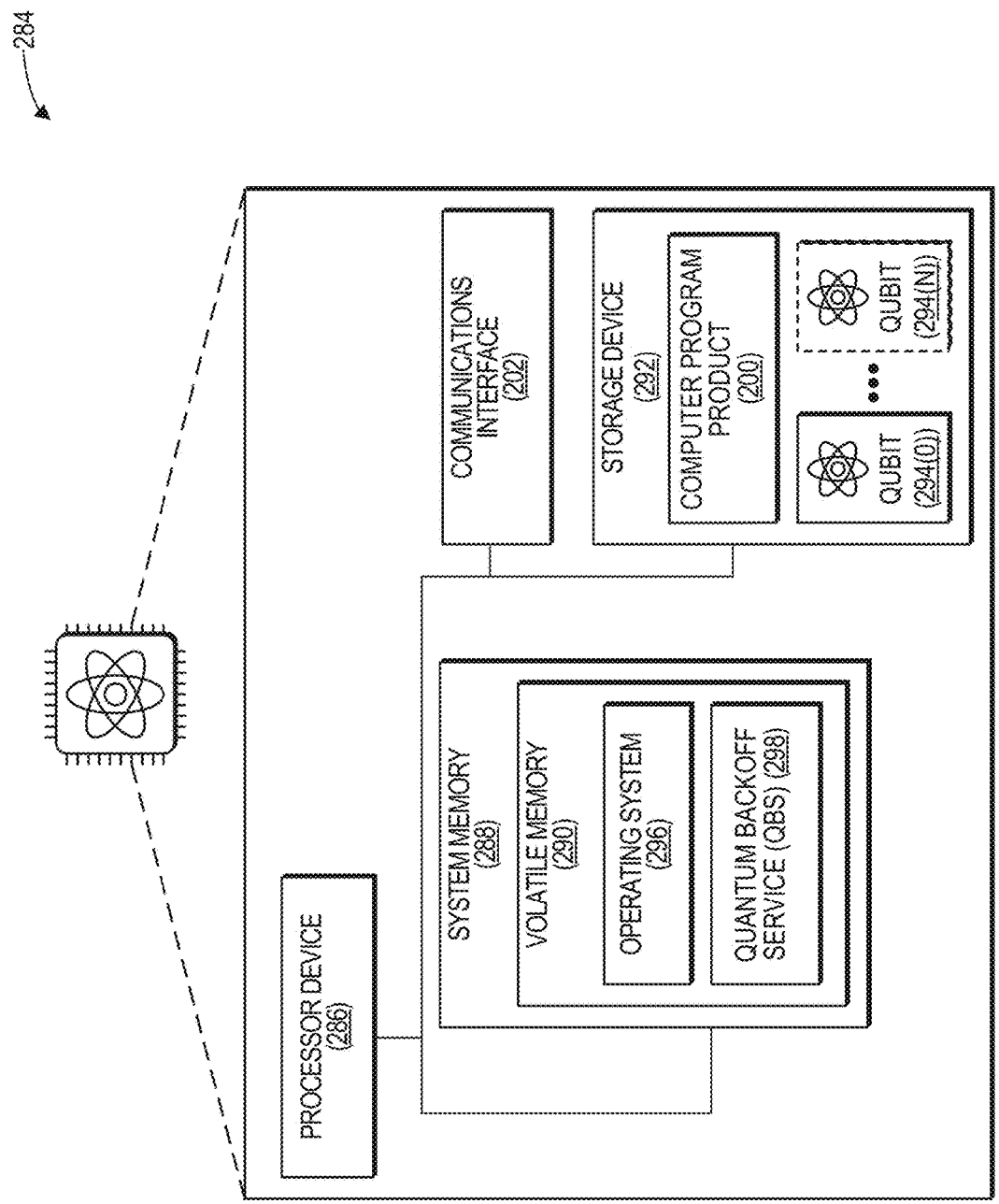
FIG. 7 is a block diagram of a quantum computing device suitable for implementing examples, according to one example.

FIG. 7 is a block diagram of a quantum computing device 284, such as the quantum computing device 10 of FIG. 1, suitable for implementing examples according to one example. The quantum computing device 284 may comprise any suitable quantum computing device or devices. The quantum computing device 284 can operate using classical computing principles or quantum computing principles. When using quantum computing principles, the quantum computing device 284 performs computations that utilize quantum-mechanical phenomena, such as superposition and entanglement. The quantum computing device 284 may operate under certain environmental conditions, such as at or near zero degrees (0°) Kelvin. When using classical computing principles, the quantum computing device 284 utilizes binary digits that have a value of either zero (0) or one (1).

The quantum computing device 284 includes a processor device 86 and a system memory 288. The processor device 286 can be any commercially available or proprietary processor suitable for operating in a quantum environment. The system memory 288 may include volatile memory 290 (e.g., random-access memory (RAM)). The quantum computing device 284 may further include or be coupled to a non-transitory computer-readable medium such as a storage device 292. The storage device 292 and other drives associated with computer-readable media and computer-usable media may provide non-volatile storage of data, data structures, computer-executable instructions, and the like. The storage device may also provide functionality for storing one or more qubits 294(0)-294(N).

A number of modules can be stored in the storage device 292 and in the volatile memory 290, including an operating system 296 and one or more modules, such as a QVC2 98. All or a portion of the examples may be implemented as a computer program product 200 stored on a transitory or non-transitory computer-usable or computer-readable medium, such as the storage device 292, which includes complex programming instructions, such as complex computer-readable program code, to cause the processor device 286 to carry out the steps described herein. Thus, the computer-readable program code can comprise computer-executable instructions for implementing the functionality of the examples described herein when executed on the processor device 286.

An operator may also be able to enter one or more configuration commands through a keyboard (not illustrated), a pointing device such as a mouse (not illustrated), or a touch-sensitive surface such as a display device (not illustrated). The quantum computing device 284 may also include a communications interface 202 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
    receiving, by a computing device, a request to create an updated version of a quantum file (QF), wherein quantum states of a first set of qubits encode current data for a current version of the QF that is assigned a current version number;
    determining, by the computing device, one or more differences between the current data for the current version of the QF and updated data for the updated version of the QF;
    in response to receiving the request, causing, by the computing device, an allocation of a second set of qubits for the updated version of the QF, wherein a cardinality of the second set of qubits is based on a quantity of information associated with the one or more differences between the current data for the current version of the QF and the updated data for the updated version of the QF;
    causing, by the computing device, a preparation of quantum states of the second set of qubits to encode the updated data for the updated version of the QF;
    assigning, by the computing device, an updated version number to the updated version of the QF based on the current version number assigned to the current version of the QF;
    generating, by the computing device, a map between the first set of qubits and the second set of qubits based on a correspondence between a first portion of the updated data and a first portion of the current data, wherein each of the first portion of the current data and the first portion of the updated data encodes one or more equivalences between the updated data and the current data; and
    updating, by the computing device, metadata for the QF to indicate:
        an association between the updated version of the QF, the updated version number, and the second set of qubits; and
        the map between the first set of qubits and the second set of qubits.

2. The method of claim 1, further comprising:
    receiving, by the computing device, a set of credentials associated with the request;
    authenticating, by the computing device, the request based on the set of credentials; and
    in response to authenticating the request, allocating, by the computing device, the second set of qubits for the updated version of the QF.

3. The method of claim 1, wherein the current version number assigned to the current version of the QF is encoded in the metadata for the QF and the method further comprises:
    receiving, by the computing device, a reference to the metadata for the QF;
    accessing, by the computing device, the metadata for the QF based on the reference;
    identifying, by the computing device, the current version number assigned to the current version of the QF based on accessing the metadata for the QF; and
    determining, by the computing device, the updated version number based on incrementing the current version number.

4. The method of claim 1, further comprising:
    receiving, by the computing device, the updated data for the updated version of the QF; and
    wherein determining the one or more differences between the current data for the current version of the QF and the updated data for the updated version of the QF comprises:
        determining, by the computing device, the quantity of information associated with the one or more differences based on reading the updated data; and
        determining, by the computing device, the cardinality of the second set of qubits, based on the quantity of information.

5. The method of claim 1, wherein causing the allocation of the second set of qubits comprises:
    providing, by the computing device, an allocation request to a qubit allocation service, wherein the allocation request encodes the cardinality of the second set of qubits; and
    in response to providing the allocation request, receiving, by the computing device, an encoding of a second set of qubit addresses corresponding to the second set of qubits.

6. The method of claim 5, wherein causing the allocation of the second set of qubits further comprises:
    receiving, by the qubit allocation service, the allocation request;
    in response to receiving the allocation request, allocating, by the qubit allocation service, the second set of qubits based on the cardinality of the second set of qubits encoded in the allocation request and a qubit allocation table; and
    providing, by the qubit allocation service, the encoding of the second set of qubit addresses corresponding to the second set of qubits to the computing device.

7. The method of claim 6, wherein allocating the second set of qubits comprises:
    identifying, by the qubit allocation service, the second set of qubit addresses based on a qubit allocation table indicating that each qubit address in the second set of qubit addresses corresponds to a qubit that is currently unallocated;
    for each qubit address in the second set of qubit addresses, allocating, by the qubit allocation service, the qubit corresponding to the qubit address by including the qubit in the second set of qubits; and
    updating, by the qubit allocation service, the qubit allocation table to indicate that each qubit address in the second set of qubit addresses is currently allocated.

8. The method of claim 1, wherein a first set of qubit addresses is encoded in the metadata for the QF, wherein each address of the first set of qubit addresses corresponds to a qubit in the first set of qubits and the method further comprises:
 identifying, by the computing device, the first set of qubit address by consulting the metadata for the QF; and
 causing, by the computing device, an access of the current data for the current version of the QF based on the first set of qubit addresses.

9. The method of claim 8, wherein causing the access of the current data comprises:
 providing, by the computing device, a qubit read request to a qubit measurement service, wherein the qubit read request encodes the first set of qubit addresses; and
 in response to providing the first set of qubit addresses, receiving, by the computing device, an encoding of the current data for the current version of the QF from the qubit measurement service.

10. The method of claim 9, wherein causing the access of the current data further comprises:
 receiving, by the qubit measurement service, the qubit read request;
 accessing, by the qubit measurement service, the first set of qubits based on the first set of qubit addresses encoded in the qubit read request;
 in response to receiving the qubit read request, measuring, at the qubit measurement service, a quantum state of each qubit included in the first set of qubits;
 generating, by the qubit measurement service, the encoding of the current data for the current version of the QF based on observing the quantum state of each qubit included in the first set of qubits; and
 providing, by the qubit measurement service, the encoding of the current data for the current version of the QF to the computing device.

11. The method of claim 1, wherein, prior to generating the map between the first set of qubits and the second set of qubits, the method comprises:
 generating, by the computing device, difference data structure encoding the one or more differences between the updated data and the current data and the one or more equivalences between the updated data and the current data;
 identifying, by the computing device, the first portion of the current data and the first portion of the updated data, wherein each of the first portion of the current data and the first portion of the updated data encodes the one or more equivalences between the updated data and the current data; and
 identifying, by the computing device, a second portion of the current data and a second portion of the updated data, wherein each of the second portion of the current data and the second portion of the updated data encodes the one or more differences between the updated data and the current data.

12. The method of claim 11, wherein the first portion of the updated data is equivalent to the first portion of the current data and the second portion of the updated data is a one's complement encoding of the second portion of the current data.

13. The method of claim 11, wherein the map is further based on
 a correspondence between the second portion of the updated data and the second portion of the current data; and wherein the method further comprises:
 identifying, by the computing device, a first subset of the first set of qubits and a first subset of the second set of qubits based on the correspondence between the first portion of the updated data and the first portion of current data; and
 identifying, by the computing device, a second subset of the first set of qubits and a second subset of the second set of qubits based on the correspondence between the second portion of the updated data and the second portion of current data.

14. The method of claim 13, wherein causing the preparation of the quantum states of the second set of qubits to encode the updated data comprises:
 causing, by the computing device, a preparation of quantum states of the first subset of qubits of the second set of qubits to encode the first portion of the current data.

15. The method of claim 13, wherein causing the preparation of the quantum states of the second set of qubits to encode the updated data comprises:
 causing, by the computing device, a preparation of quantum states of the second subset of qubits of the second set of qubits to encode the second portion of the updated data.

16. The method of claim 13, wherein updating the metadata for the QF comprises:
 updating the metadata for the QF to indicate a correspondence between the first subset of the first set of qubits and the first subset of the second set of qubits; and
 updating the metadata for the QF to indicate a correspondence between the second subset of the first set of qubits and the second subset of the second set of qubits.

17. The method of claim 1, wherein updating the metadata for the QF comprises:
 updating the metadata for the QF to indicate a version history of the QF that enables a recovery of each version of a plurality versions of the QF.

18. The method of claim 1, further comprising:
 causing, by the computing device, a preparation of quantum states of a third set of qubits such that the quantum states of third set of qubits is in a superposition that encodes each version of a plurality of versions of the QF.

19. A computing device, comprising:
 a system memory; and
 a processor device communicatively coupled to the system memory, the processor device to:
  receive a request to create an updated version of a quantum file (QF), wherein quantum states of a first set of qubits encode current data for a current version of the QF that is assigned a current version number;
  determine one or more differences between the current data for the current version of the QF and updated data for the updated version of the QF;
  in response to receiving the request, cause an allocation of a second set of qubits for the updated version of the QF, wherein a cardinality of the second set of qubits is based on a quantity of information associated with the one or more differences between the current data for the current version of the QF and the updated data for the updated version of the QF;
  cause a preparation of quantum states of the second set of qubits to encode the updated data for the updated version of the QF;
  assign an updated version number to the updated version of the QF based on the current version number assigned to the current version of the QF;

generate a map between the first set of qubits and the second set of qubits based on a correspondence between a first portion of the updated data and a first portion of the current data, wherein each of the first portion of the current data and the first portion of the updated data encodes one or more equivalences between the updated data and the current data; and update metadata for the QF to indicate:
an association between the updated version of the QF, the updated version number, and the second set of qubits; and
the map between the first set of qubits and the second set of qubits.

20. A non-transitory computer-readable medium having stored thereon computer-executable instructions that, when executed, cause one or more processor devices to:

receive a request to create an updated version of a quantum file (QF), wherein quantum states of a first set of qubits encode current data for a current version of the QF that is assigned a current version number;

determine one or more differences between the current data for the current version of the QF and updated data for the updated version of the QF;

in response to receiving the request, cause an allocation of a second set of qubits for the updated version of the QF, wherein a cardinality of the second set of qubits is based on a quantity of information associated with the one or more differences between the current data for the current version of the QF and the updated data for the updated version of the QF;

cause a preparation of quantum states of the second set of qubits to encode the updated data for the updated version of the QF;

assign an updated version number to the updated version of the QF based on the current version number assigned to the current version of the QF;

generate a map between the first set of qubits and the second set of qubits based on a correspondence between a first portion of the updated data and a first portion of the current data, wherein each of the first portion of the current data and the first portion of the updated data encodes one or more equivalences between the updated data and the current data; and update metadata for the QF to indicate:
an association between the updated version of the QF, the updated version number, and the second set of qubits; and
the map between the first set of qubits and the second set of qubits.

\* \* \* \* \*